United States Patent [19]
Strader

[11] 3,757,455
[45] Sept. 11, 1973

[54] FISHING LURE
[75] Inventor: James W. Strader, Tallahassee, Fla.
[73] Assignee: Capt. Jim Strader, Inc., Fort Lauderdale, Fla.
[22] Filed: June 9, 1971
[21] Appl. No.: 151,543

Related U.S. Application Data
[63] Continuation of Ser. No. 843,354, July 22, 1969, abandoned.

[52] U.S. Cl............... 43/42.14, 43/42.17, 43/42.31, 43/42.34
[51] Int. Cl............................................ A01k 85/00
[58] Field of Search...................... 43/42.31, 42.34, 43/42.14, 42.17

[56] References Cited
UNITED STATES PATENTS
2,613,471 10/1952 Traycik............................. 43/42.31
2,765,571 10/1956 Sinclair............................. 43/42.34
3,045,382 7/1962 Watkins............................. 43/42.17

Primary Examiner—Louis G. Mancene
Assistant Examiner—Daniel J. Leach
Attorney—Eugene F. Malin

[57] ABSTRACT

A fishing lure having a spinner on the front end and a spinner on the rear end with each spinner formed so it will rotate in the same direction as the other spinner and means for varying the frictional hold on the spinners to vary the spin of each spinner so as to vary the rocking motion of the spinner in the water in order to flash the light-reflecting eyes and to produce a sound by causing the balls to move within the body of the lure and the balls to hit one another.

2 Claims, 3 Drawing Figures

PATENTED SEP 11 1973

3,757,455

INVENTOR.
JAMES W. STRADER
BY
ATTORNEY

FISHING LURE

This is a continuation of U. S. Pat. application, Ser. No. 843,354, entitled "Fishing Lure," filed July 22, 1969, now abandoned.

BACKGROUND OF THE INVENTION

This invention relates in general to fishing lures and more particularly, to an improvement in fishing lure movement and sound. This particular lure illustrated and described in this specification is especially successful in fishing for bass. I do not wish to be limited to a lure for bass fishing but the new and novel details of my fishing lure may be applied to fishing lures in general.

The use of spinners on each end of a lure is old in the art and has been practiced for many years. Placing of noisemakers within the body of a lure to produce a noise when the lure is moved is also old in the art.

SUMMARY OF THE INVENTION

The fishing lure described herein comprises a spinner at each end of the lure, both spinners spinning in the same direction to impart a rocking motion to the lure. Further, the fishing lure spinners may be adjusted so as to prevent rotation or vary the speed of rotation to give a variable rocking motion to the lure. The rocking motion flashes the light reflection eyes to attract fish. The noise making chamber and the ball therein provide noise simultaneously with the flashing light reflecting eyes. The noise stops when the lure comes to a rest in the water.

The primary object of my invention is to provide a fishing lure which will have a rocking motion as it is moved relative to the water and which will produce simultaneously a light-reflection from the eyes and a noise from the noise chamber to attract fish.

A further object of my invention is to provide a lure in which the speed and length of travel of the rocking motion may be adjusted according to the desires of the operator to change the frequency of the light flashing and the intensity of the sound.

Another object of this invention is to provide a rocking noise making lure that is quiet a short time after it comes to rest in the water.

In accordance with these and other objects which will be apparent hereinafter, the instant invention will now be described with particular reference to the accompanying drawings.

DESCRIPTION OF THE PREFERRED EMBODIMENT

Figure 1:
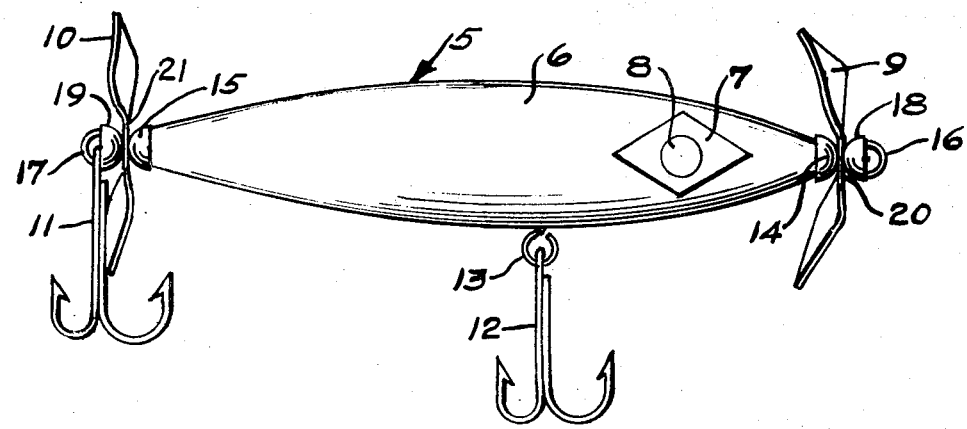
FIG. 1 is a side elevational view of a fishing lure according to my invention.

Reference is made to the drawing in which fishing lure 5 has an elongated body 6 with a spinner 9 mounted on the front end thereof and a spinner 10 mounted at the rear end thereof. Ordinary hook 12 is mounted by screw eye 13 on the underside of body 6 near the center thereof. Ordinary hook 11 is mounted on the rear end of body 6 beyond the spinner 10.

On each side of body 6 near the front end thereof is a raised eye member 7 shown here as being diamond shaped. In the center of each eye member 7 is a circular eye 8 which is painted with a suitable paint as to reflect light rays. Any type of reflective paint may be used or glass reflective eyes may be attached to member 7.

Spinner 9 is mounted on the front of body member 6 by means of screw eye 16 which extends through flat portion 20 of the spinner 9. Screw eye 16 has threads on the end thereof and also passes through cap member 14 on the end of body 6 and cap member 18 into which screw eye 16 fits. The screw eye threads are embedded into T-shaped plastic plug 22.

Spinner 10 is mounted on the rear of body 6 by means of screw eye 17 which extends through cap member 19, flat portion 21 of spinner 10 and cap member 15 in the same manner as screw eye 16 is described in the preceding paragraph. The screw eye threads are embedded into T-shaped plastic plug 23.

If it is desired that either or both of the spinners should turn relative to body member 6 than screw eye 16 may be turned so that it moves in a direction away from body 6 and the flat portion 20 will rotate about the shaft of screw eye 16. The blades of spinner 9 are pitched at an angle which will cause it to rotate as it is moved through the water.

Spinner 10 may be placed in condition for spinning in the same manner.

If it is desired that the rotation of the spinners 9 and 10 be frictionally held for slow movement or stopped then screw eyes 16 and 17 are screwed inwardly until flat portion 20 is gripped between caps 14 and 18 and flat portion 21 is gripped between caps 19 and 15.

The body includes a forward compartment 30 for amplifying the sound generated in the rear sound cavity 25. The intermediate wall 31 is designed to act as a sound transfer means between the rear sound cavity 25 and forward compartment 30.

Figure 2:
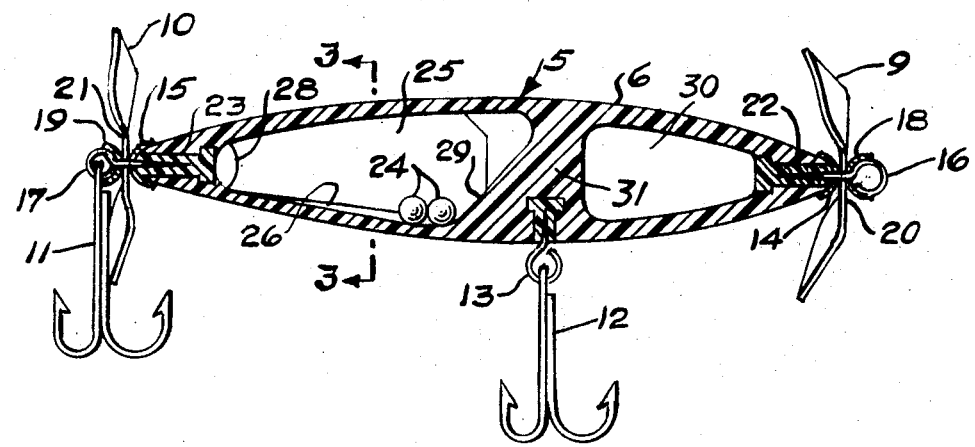
FIG. 2 is a cross-sectional view of the fishing lure shown in FIG. 1.
Figure 3:
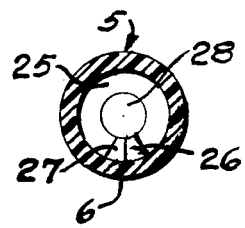
FIG. 3 is a cross-sectional view of the lure in FIG. 2 taken along lines 3—3 and looking in the direction of the arrows.

Body portion 6 has a cavity 25 formed therein for the accommodation of balls 24. The bottom of cavity 25 is slanted downwardly in a forward direction so that the balls 24 will rest in substantially the position shown in FIG. 2 when the lure is not moving. The bottom of the cavity 25 has two flat portions 26 and 27 forming a generally V-shaped floor. This floor design brings the balls to rest quickly when the lure is brought to rest. The back 28 and front 29 of the cavity slope upward.

In operation of the lure, with spinners 9 and 10 adjusted so that they will rotate relative to the body 6, a line is attached to screw eye 16. When lure 5 is at rest and no motion whatsoever is imparted to it, spinners 9 and 10 are motionless, balls 24 are at rest and soundless on the bottom of cavity 25.

If lure 5 is pulled forwardly spinners 9 and 10, being pitched in the same direction, will rotate due to the action of the water against the surfaces of the spinner blades. Since they are rotating in the same direction, the torque thereby created will cause the body 6 to rock back and forth in a sidewise motion. As the body rocks the balls 24 will be moved and be caused to click together against each other creating a rattling sound. Also, the reflective portions 8 of eyes 7 will be rocking back and forth thereby reflecting light in many directions away from the body 6.

As lure 5 is moved faster through the water the frequency of the rocking becomes greater thus increasing the intensity of the sound and decreasing the interval of time between light reflections in any one specific direction.

When it is desired to increase the speed of the rocking motion without increasing the speed with which it is dragged through the water each of screw eyes 16 and 17 may be tightened to cause spinner 9 and 10 to remain in a fixed position relative to body 6. In this condition the movement of spinners 9 and 10 caused by the movement of the lure through the water will be transmitted directly to the body 6 thus causing a greater rocking motion of the lure. The greater rocking motion produces a more intense sound from balls 24 and a more frequent reflection of light by eyes 8.

The foregoing disclosure and description of the invention is illustrative and explanatory thereof and various changes in the sizes, shape and material, as well as in the details of the illustrated construction may be made, within the scope of the invention, without departing from the spirit of the invention.

What is claimed is:

1. A fishing lure comprising:

an elongated buoyant body member including a sound making cavity with sound making means therein, at least one reflecting means fixed to said body member, a spinning-rocker member connected to said body member for rotating said spinning-rocker member in relation to said body member when said fishing lure is moved through the water to attract fish and for rocking said body member to attract fish by moving said sound making cavity, at least one hook attached to said body member for catching fish, said spinning-rocker being adjustably connected to vary the frictional resistance applied to said spinning-rocker member and the amount of rocking of said body member.

2. A fishing lure as set forth in claim 1, wherein:

said spinning-rocker is adjustably connected to said body member by a screw member to vary the frictional resistance applied to said spinning-rocker member to vary the rotational speed of the spinning-rocker member and the amount of rocking of said body member.

* * * * *